US008793660B2

(12) United States Patent
Belihomji et al.

(10) Patent No.: US 8,793,660 B2
(45) Date of Patent: Jul. 29, 2014

(54) AUTOMATED TESTING OF PROGRAMMING CODE FOR A WEB SERVICE

(75) Inventors: Adil Belihomji, Kendell Park, NJ (US); Amr Zoheir, Piscataway, NJ (US); Jitendra Kommireddy, Hillsborough, NJ (US); Mary Pearl Jelinek, Somerset, NJ (US); Sajid Ahmed, Monmouth Junction, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 397 days.

(21) Appl. No.: 13/341,553

(22) Filed: Dec. 30, 2011

(65) Prior Publication Data
US 2013/0174126 A1 Jul. 4, 2013

(51) Int. Cl.
*G06F 9/44* (2006.01)
*G06F 11/00* (2006.01)
*G06F 11/36* (2006.01)

(52) U.S. Cl.
CPC ................. *G06F 11/3668* (2013.01)
USPC ................. 717/127; 717/124; 714/38.1

(58) Field of Classification Search
CPC .................................... G06F 11/3668
USPC ................. 717/124–135; 714/37, 38.1
See application file for complete search history.

(56) References Cited

U.S. PATENT DOCUMENTS

| | | | |
|---|---|---|---|
| 7,487,513 B1 * | 2/2009 | Savchenko et al. | 719/320 |
| 7,620,939 B2 * | 11/2009 | Jakubiak | 717/124 |
| 7,694,140 B1 * | 4/2010 | Sachenko et al. | 713/170 |
| 7,979,846 B2 * | 7/2011 | Grechanik et al. | 717/124 |
| 8,056,057 B2 * | 11/2011 | Larab et al. | 717/124 |
| 8,145,726 B1 * | 3/2012 | Roche et al. | 709/219 |
| 8,370,814 B2 * | 2/2013 | Grechanik et al. | 717/126 |
| 2006/0225048 A1 * | 10/2006 | Jakubiak | 717/127 |
| 2007/0089091 A1 * | 4/2007 | Larab et al. | 717/124 |
| 2008/0250051 A1 * | 10/2008 | Grechanik et al. | 707/102 |
| 2010/0095276 A1 * | 4/2010 | Ottavi et al. | 717/125 |
| 2011/0231825 A1 * | 9/2011 | Grechanik et al. | 717/126 |
| 2013/0167237 A1 * | 6/2013 | Amit et al. | 726/25 |

OTHER PUBLICATIONS

Tsai et al., "Extending WSDL to Facilitate Web Services Testing," 2002, IEEE, pg. 1-2.*
Siblini et al., "Testing Web Services," 2005, IEEE.*
Chakrabarti et al., "Connectedness Testing of RESTful Web-Services," Feb. 2010, ACM, p. 143-152.*
Rusli et al., "A Comparative Evaluation of State-of-the-Art Web Service Composition Testing Approaches," May 2011, ACM, p. 29-35.*

* cited by examiner

*Primary Examiner* — Qing Chen

(57) ABSTRACT

The testing of programming code for a web service, such as code for a web service application program or for a web service application programming interface (API), is automatically performed. A set of web service requests is generated based on potential input values for fields of the requests that are included in a spreadsheet. The web service requests are firstly processed via execution of a production version of the programming code to generate a set of production web service responses, where the production version of the programming code is assumed to generate accurate web service responses. The web service requests are then processed via execution of a new version of the programming code to generate a set of new web service responses. The web service responses of the new and production sets are compared to determine whether the new version of the programming code functions accurately.

24 Claims, 9 Drawing Sheets

| MDN | Firmware Version | Transaction ID | Channel ID | ... |
|---|---|---|---|---|
| 123-456-7890 | T5eVZV02 | GETCATITEMBYGROUP_01 | 19 | ... |
| 987-654-3210 | A870.ZD09 | GETCATITEMBYGROUP_02 | 13 | ... |
| Asdf458 | $$skip$$ | GETCATITEMBYGROUP_03 | a4 | ... |
| $$skip$$ | 110 | GETCATITEMBYGROUP_04 | n/a | ... |
| | 4.3.0 | | $$skip$$ | ... |

301 — MDN
302 — Firmware Version
311, 312, 313

FIG. 3B

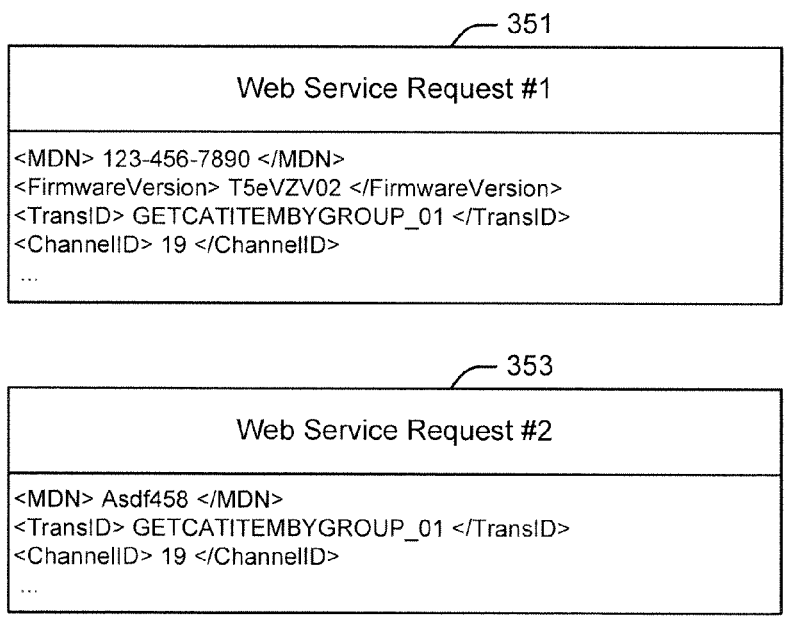

351 — Web Service Request #1

```
<MDN> 123-456-7890 </MDN>
<FirmwareVersion> T5eVZV02 </FirmwareVersion>
<TransID> GETCATITEMBYGROUP_01 </TransID>
<ChannelID> 19 </ChannelID>
...
```

353 — Web Service Request #2

```
<MDN> Asdf458 </MDN>
<TransID> GETCATITEMBYGROUP_01 </TransID>
<ChannelID> 19 </ChannelID>
...
```

*FIG. 4A*  
117

| ScenarioID | Web Service | Execution Sequence | RowID |
|---|---|---|---|
| 1 | Checkout | 1 | 2 |
| 1 | SubmitPurchase | 2 | 1 |
| 1 | ViewPurchases | 3 | 1 |
| 1 | GetPendingDownloads | 4 | 1 |
| 2 | Checkout | 1 | 4 |
| ... | ... | ... | ... |

*FIG. 4B*  
113b

| MDN | Firmware Version | Confirmation ID | Channel ID | ... |
|---|---|---|---|---|
| 987-654-3210 | A870.ZD09 | $$1.ConfirmationID$$ | 13 | ... |
| 987-654-3210 | A870.ZD09 | $$1.ConfirmationID$$ | 25 | ... |
| ... | ... | ... | ... | ... |

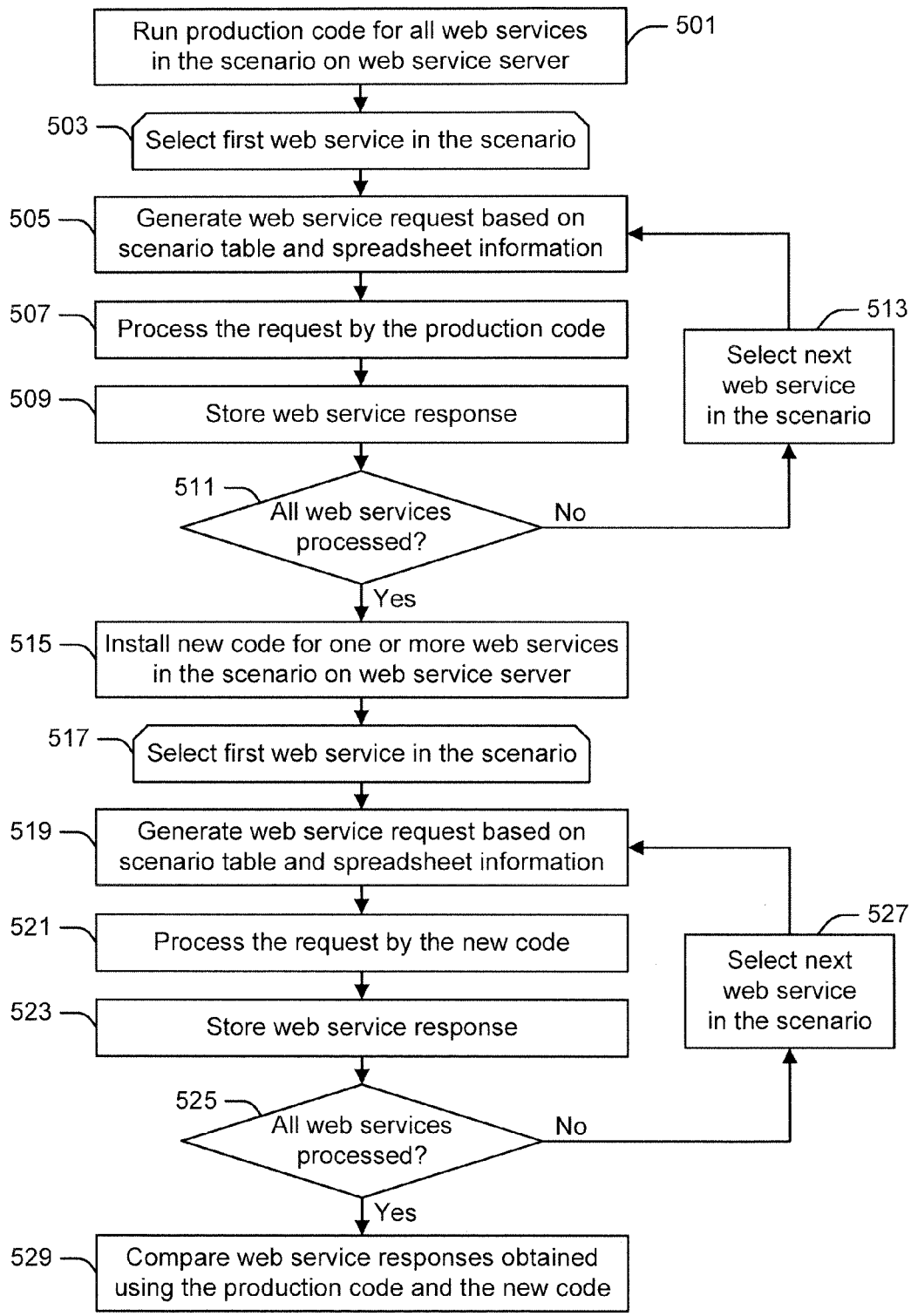

SCMPlus Testing Automation Tool (STAT)

Please select the Run ID

Select Run By: User 1
Select Run Type: Banking / Regression
Select API Type: Discovery / Scenario Select Run Please

Regression Test Run Summary

| Run ID | Run Type | API Type | Date of the Run | Total API's Tested | APIs Passed | APIs Failed |
|---|---|---|---|---|---|---|
| 20111011133515 | apis regress | Discovery | 10/11/2011 | 1 | 0 | 1 |

| getdeck | sunny | | Passed | 73 |
|---|---|---|---|---|
| | | | Failed | 2 |

SCMPlus Testing Automation Tool (STAT)

| API Level Regression Results | close window |
|---|---|
| Api Name: getdeck | Run ID: 20111011133515 |
| Code: 200, Desc: Success | |
| TestCase #17       TestCase #63 | |
| 1 - 2 of 2 | |

API Level Regression Results

Api Name: getdeck     Run ID: 20111011133515     Test Case #: 17

Show All     Show Request [Expand]     Show Differences     Next TestCase #63

Expected

```
<RespGetDeck xmlns="http://www.vzw.com/namespaces/scmplus">
  <Category>
    <CatID>803619</CatID>
    <CatName><![CDATA[New Releases]]></CatName>
    <CatDisplayName><![CDATA[What's New]]></CatDisplayNa
    <CatDescription><![CDATA[New Releases]]></CatDescrip
    <Position>1</Position>
  </Category>
  <Category>
    <CatID>803620</CatID>
    <CatName><![CDATA[What's Hot]]></CatName>
    <CatDisplayName><![CDATA[What's Hot]]></CatDisplayNa
    <CatDescription><![CDATA[What's Hot]]></CatDescripti
    <Position>2</Position>
  </Category>
  <Category>
    <CatID>803621</CatID>
    <CatName><![CDATA[Jukeboxes & Playlists]]></CatName>
    <CatDisplayName><![CDATA[Jukeboxes & Playlists]]></C
    <CatDescription><![CDATA[Jukeboxes & Playlists]]></C
    <Position>3</Position>
  </Category>
  <Category>
    <CatID>803622</CatID>
    <CatName><![CDATA[Browse]]></CatName>
    <CatDisplayName><![CDATA[Browse]]></CatDisplayName>
    <CatDescription><![CDATA[Browse]]></CatDescription>
    <Position>4</Position>
  </Category>
```

Actual (Bank It)

```
<RespGetDeck xmlns="http://www.vzw.com/namespaces/scmplus">
  <Category>
    <CatID>803619</CatID>
    <CatName><![CDATA[New Releases]]></CatName>
    <CatDisplayName><![CDATA[What's New]]></CatDisplayNa
    <CatDescription><![CDATA[New Releases]]></CatDescrip
    <Position>1</Position>
  </Category>
  <Category>
    <CatID>803620</CatID>
    <CatName><![CDATA[What's Hot]]></CatName>
    <CatDisplayName><![CDATA[What's Hot]]></CatDisplayNa
    <CatDescription><![CDATA[What's Hot]]></CatDescripti
    <Position>2</Position>
  </Category>
  <Category>
    <CatID>803621</CatID>
    <CatName><![CDATA[Jukeboxes & Playlists]]></CatName>
    <CatDisplayName><![CDATA[Jukeboxes & Playlists]]></C
    <CatDescription><![CDATA[Jukeboxes & Playlists]]></C
    <Position>3</Position>
  </Category>
  <Category>
    <CatID>803622</CatID>
    <CatName><![CDATA[Browse]]></CatName>
    <CatDisplayName><![CDATA[Browse...]]></CatDisplayName>
    <CatDescription><![CDATA[Browse...]]></CatDescription>
    <Position>4</Position>
  </Category>
```

FIG. 6D

API Level Regression Results

Api Name: getdeck  Run ID: 20111011133515  Test Case #: 17

Show All  Show Request [Expand]  Show Differences  Next TestCase #63

| Expected | Actual (Bank It) |
|---|---|
| (72){Does Not Exist} | (72) <DeviceIcon> |
| (73){Does Not Exist} | (73) <URL><![CDATA[http://mediaimages.vzw.com/sc |
| (74){Does Not Exist} | (74) <MimeType><![CDATA[image/jpeg]]></MimeType> |
| (75){Does Not Exist} | (75) </DeviceIcon> |
| (83){Does Not Exist} | (83) <DeviceIcon> |
| (84){Does Not Exist} | (84) <URL><![CDATA[http://mediaimages.vzw.com/sc |
| (85){Does Not Exist} | (85) <MimeType><![CDATA[image/jpeg]]></MimeType> |
| (86){Does Not Exist} | (86) </DeviceIcon> |
| (94){Does Not Exist} | (94) <DeviceIcon> |
| (95){Does Not Exist} | (95) <URL><![CDATA[http://mediaimages.vzw.com/sc |
| (96){Does Not Exist} | (96) <MimeType><![CDATA[image/jpeg]]></MimeType> |
| (97){Does Not Exist} | (97) </DeviceIcon> |
| (105){Does Not Exist} | (105) <DeviceIcon> |
| (106){Does Not Exist} | (106) <URL><![CDATA[http://mediaimages.vzw.com/sc |
| (107){Does Not Exist} | (107) <MimeType><![CDATA[image/jpeg]]></MimeType> |
| (108){Does Not Exist} | (108) </DeviceIcon> |
| (116){Does Not Exist} | (116) <DeviceIcon> |
| (117){Does Not Exist} | (117) <URL><![CDATA[http://mediaimages.vzw.com/sc |
| (118){Does Not Exist} | (118) <MimeType><![CDATA[image/jpeg]]></MimeType> |
| (119){Does Not Exist} | (119) </DeviceIcon> |
| (127){Does Not Exist} | (127) <DeviceIcon> |
| (128){Does Not Exist} | (128) <URL><![CDATA[http://mediaimages.vzw.com/sc |
| (129){Does Not Exist} | (129) <MimeType><![CDATA[image/jpeg]]></MimeType> |
| (130){Does Not Exist} | (130) </DeviceIcon> |
| (138){Does Not Exist} | (138) <DeviceIcon> |
| (139){Does Not Exist} | (139) <URL><![CDATA[http://mediaimages.vzw.com/sc |
| (140){Does Not Exist} | (140) <MimeType><![CDATA[image/jpeg]]></MimeType> |
| (141){Does Not Exist} | (141) </DeviceIcon> |
| (149){Does Not Exist} | (149) <DeviceIcon> |
| (150){Does Not Exist} | (150) <URL><![CDATA[http://mediaimages.vzw.com/sc |

607

AUTOMATED TESTING OF PROGRAMMING CODE FOR A WEB SERVICE

BACKGROUND

Web services provide access to data, information, and other functionality to client or host devices on a network. In general, a client device or host device transmits a web service request, including a query for data or information, to a web service server. In response to receiving the web service request, the server executes programming code for the web service and generates a web service response based on the received request. The server transmits the generated response, including data or information related to the query, back to the client device or host device having transmitted the query. The client device or host device may communicate directly with the web service, or may communicate with a web service application programming interface (API) associated with the web service.

Many advanced networks provide extensible markup language (XML) based web services that enable individual users and systems access to network data. For example, such web services may be based on one or more network protocols designed to facilitate communications between users and web servers that host one or more services for the users. Examples of such communication protocols include, but are not limited to, the Simple Object Access Protocol (SOAP) and the HyperText Transfer Protocol (HTTP). The web services may also be designed to facilitate communications between a host or server and the web servers that host services for the host or server. A user (or host/server) may access a web service, for example through a web service application program or a web service API, which can provide one or more operations or functions (e.g., methods) for the user (or host/server) to use in accessing the web service. One example of a web service is a virtual store web service, which may have one or more services for searching or browsing a catalog, selecting items from the catalog, performing checkout to purchase catalog items, or the like.

To access the methods of a web service, a user's or host's client device generally establishes a network connection to a web server hosting the particular web service. Accordingly, the web service is typically associated with a specific uniform resource locator (URL) that defines the host name and port number for network communications in addition to, for example, the particular location of the web service application in the directory structure of the server. Once a connection is established with the user's or host's client device, the web service provides access to its data and methods, as requested by the client. The client device may communicate directly with the web service, or may communicate with the web service through one or more APIs associated with the web service.

The programming code of a web service may be updated to provide new functionalities to users and client devices, to improve the efficiency of the web service (or associated web service API), or the like. When web service (or web service API) programming code is updated or improved, the web service (or web service API) needs to be tested to ensure the stability of the service under different conditions, the proper functioning of the service, etc. As programming code for web services are updated with increasing frequency, and as the programming code and the web services include increasingly complex and interdependent features that requiring testing, a need exists to quickly, reliably, and automatically test the programming code for web services to ensure the proper functioning of web services provided to users.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 3A is a schematic diagram showing an exemplary spreadsheet storing potential input values for inclusion in web service requests.

FIG. 3B is a schematic diagram showing exemplary web service requests.

FIG. 4A is a schematic diagram showing an exemplary table used for storing configuration data for scenarios used in testing of programming code for web services.

FIG. 4B is a schematic diagram showing an exemplary spreadsheet storing potential input values for inclusion in web service requests.

FIG. 5 is a simplified flow diagram showing operations involved in automatically testing programming code for web services included in a scenario.

FIGS. 6A-6D are illustrations of various graphical user interfaces of an illustrative web-based application for automatically testing programming code for a web service.

DETAILED DESCRIPTION

Figure 1:
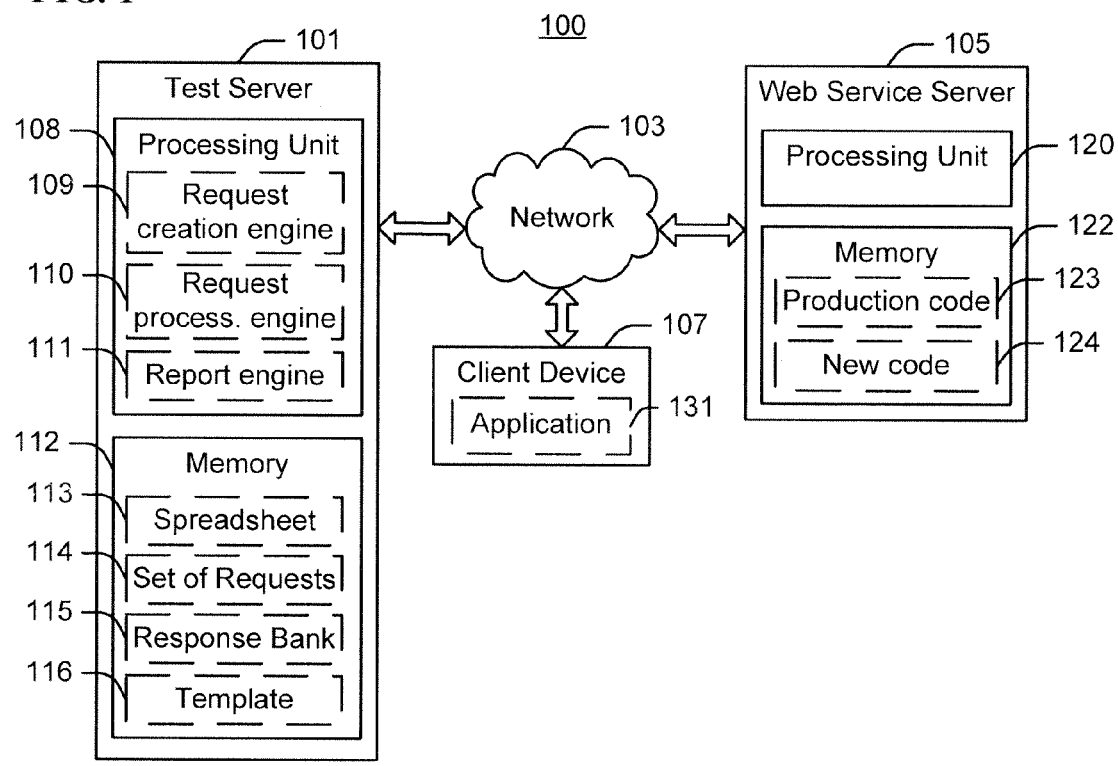
FIG. 1 is a simplified block diagram of a system for automatically testing programming code for a web service.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

Web services are increasingly being provided to users' or hosts' client devices across networks, such as mobile carrier networks, data networks, or the like. The client devices run applications which rely on data and content provided by web service servers for their operation. Users of the client devices may additionally or alternatively request data or content directly from the web service servers. The data and content can be provided directly to the users' or hosts' client device by a web service application program running on a web service server, or by one or more application programming interfaces (APIs) running on the web service server for providing the web service. The web service (through the application program, and/or associated APIs) can be implemented as computer-readable instructions or code stored on and/or running on one or more web service server(s).

A provider of a web service (including a web service application program and/or a web service API) may update or modify the programming code for the web service in order to provide new web service content or capabilities, to enable the web service to run more efficiently or smoothly, to correct errors or improve functioning of the web service, or the like. As part of the updating or modifying of the programming code, however, the code generally requires testing in order to ensure that the programming code and the associated web service(s) function properly. For example, the programming code requires testing to ensure that the web service provides accurate responses or results, functions with a variety of client devices, types of client devices, and/or networks (e.g., mobile carrier networks or wide area networks), provides proper error responses, etc.

The testing of the programming code may involve installing the programming code on a web service server for execution on a processor of the web service server, sending different web service requests to the server, receiving web service response messages in response to each request, and analyzing the received responses to determine the proper functioning of the programming code and of the associated web service application program or API. In order to perform the testing efficiently, and in order to perform the testing with respect to large numbers or varieties of requests, the testing may be automated. Generally, the automated testing may rely on a production version of the programming code, such as a version of the programming code that is known or assumed to provide accurate results/responses, and on a new version of the programming code, corresponding to the code needing to be tested. The automated testing may involve automatically generating a large number of web service requests, the requests including requests expected to produce normal and error web service responses. The web service requests may firstly be processed by the production version of the programming code, and the responses generated thereby may be stored. The web service requests may secondly be processed by the new version of the programming code, and the responses generated by the new code compared with the stored responses generated by the production code. The comparison of the responses may be used to determine whether or not the new code provides responses identical (or similar) to those provided by the production code. The comparison may further be used to determine whether any differences between the responses are expected, or not, from the new code.

The detailed description below uses a number of terms with respect to various system components and operations. Although generally known, use of several of these terms may not be strictly standardized in the art. For the convenience of the reader, the following definitions for some of the relevant terms are presented, as used by way of example in the detailed description below.

The terms "service" and "web service" are used interchangeably herein to refer broadly and inclusively to any unit of software functionality that is exposed to at least one other service, application, or system on a local area network, wide area network, or even a single process. For example, such functionality of the web service may be provided to one or more clients via an interface described in a machine-readable format, for example, the Web Services Description Language (WSDL). A web service generally passes messages (e.g., requests and responses) to and from clients as a form of communication through the communication network. Furthermore, the communication network can include the Internet or World Wide Web, and the service can be a web service hosted at a server configured to exchange communication with clients over the Internet.

A service that uses messages in an extensible markup language (XML) format is typically referred to as an "XML service." An example of a commonly used network communication protocol that uses messages in XML format is the Simple Object Access Protocol (SOAP). Services that use the SOAP protocol are often called SOAP services. For example, a SOAP service may define a message envelope that contains a header portion and a body portion. Further, each SOAP message may be included or wrapped in a Hyper-Text Transfer Protocol (HTTP) message for communication over the Internet. Additional features and characteristics of services using XML formatted messages with SOAP and HTTP would be apparent to a person skilled in the relevant art given this description.

The term "client" is used herein to refer broadly to any process configured to consume a functionality of a service offered by a server. For example, when a client uses a service, the client is generally utilizing at least one function of the service. Such a client may be executed at any type of computing device (e.g., a client device) including, for example and without limitation, a desktop computer or workstation, a mobile device, or a host or network device that may operate at other times as a server to other clients. A "server" process may be executed by any type of computing device capable of communicating data to one or more clients over a communication network. Further, a client can be any type of remote or local process with respect to the computing device executing or hosting the service. In one example, a server process may run on the same device as a client consuming the functionality of the server. Also, a client can be another service. An application programming interface (API) can refer to a process providing an interface for (or access to) one or more web services. The API can be executable code used for accessing a single web service, and/or for accessing two or more web services through routines providing additional functionality over the functionality of the individual web services.

Reference now is made in detail to the examples illustrated in the accompanying drawings and discussed below. FIG. 1 shows a simplified block diagram of a system 100 for automatically testing programming code for web services, for example code for a web services server application program or for one or more web service APIs. The system 100 includes a web service server 105 for providing the web services through network 103, such as web services provided to a client device 107 or to a test server 101. The system 100 further includes the test server 101 for performing tests of programming code for web services on the web service server 105. The web service server 105, test server 103, and client device 107 may communicate with each other through network 103, which may include a mobile carrier network, a wide or local area network (e.g., a packet switched network), and/or the like. While web service server 105 and test server 101 are illustratively shown as separate servers in FIG. 1, the servers may form part of a single server system (e.g., web service server 105 and test server 101 may be implemented as server applications on a single physical computer system).

The network 103 can be implemented as one network or as a number of interconnected networks. The network 103 may be a local or private network for testing purposes, e.g. to avoid impact on actual customers. Alternatively, the network 103 may be the actual traffic network through which the server 105 communicates with customers during actual operation or production. In an example, the network is an actual network providing mobile communications to wireless devices of mobile customers. In that example, the network 103 may include a wireless mobile communication network (e.g., SS7-, CDMA-, or GSM-based networks), a wireless network, a wireless Ethernet/IP-based network, or the like. The network allows mobile devices 107 to initiate and receive communications with each other, and/or with the web service server 105. The network 103 typically offers a variety of data services via the Internet, such as downloads, web browsing, email, etc. The client device 107 can be a mobile station, a portable handset, a smart-phone or personal digital assistant, a personal computer, network terminal, or other computing device used to access web services and/or web service APIs, such as web services offered to users or host servers by web service server 105.

The web service server 105 includes a memory 122 for storing one or more production versions 123 of programming code (also referred to as production code 123), and one or more new versions 124 of programming code (also referred to as new code 124). The various versions of programming code may have been developed using software configuration management. The web service server 105 is generally a server or computer system configured as a test environment for the web services (such as for web service server application programs or APIs), and may be connected through the network 103 to a test server 101 and/or to client devices 107. For example, the web service server 105 may be configured as a test environment for one or more web services if the server is connected to a local or private network for testing purposes, the server is configured to only receive web service requests from a test server 101 or a client device 107 performing a testing function, and/or the server is configured to only send web service response messages to a test server 101 or a client device 107 performing a testing function. In some examples, the web service server 105 may be a server that is dedicated to testing programming code for web services.

The programming code stored on the web service server 105 includes machine-readable code and/or program instructions for execution on a processing unit 120 of the server 105 to provide the web services, such as code for web service server application programs or APIs. The production version 123 of programming code is a version of the programming code that is assumed to be accurate, functional, and to generate accurate results or responses. The production version 123 of the programming code or one or more copies thereof may be in active use on one or more web service servers, and may be used to provide web service application programs or APIs to client devices 107. The new version 124 of programming code is a version of the code that is to be tested. While the new version 124 of programming code may be accurate, fully functional, and generate accurate results or responses, the new version of programming code is not assumed to produce accurate results or responses prior to testing. The new version of the programming code may be used to provide web service application programs or APIs for testing by the test server 101. Both the production version 123 and new version 124 of programming code may be used to, in response to receiving a web service request on server 105, generate a web service response message. The web service response message may include data, or other information, based on one or more input values included in the request.

A client device 107 may communicate with the web service server 105 through network 103. One or more application(s) 131 running on client device 107 may access web services provided by the web service server 105. In general, an application 131 can access a web service provided by the production code 123 on web service server 105. For example, the client device 107 or application 131 can access the web service application program and/or API by sending a web service request to the web service (e.g., to an address, URL, host name, port number, or the like associated with the web service and/or web service server 105). The request can take the form of an extensible markup language (XML) request. The request can include one or more input values, such as identifiers for the client device 107 and/or the application 131, and one or more input parameters for the requested web service. For example, the request may include a mobile directory number (MDN), mobile identification number (MIN), MAC address, IP address, or other identifier for the client device 107. The request may include an identifier for the web service of the web service server 105 that the request should be transmitted to. The request may further include input parameters for the web service, such as input parameters defining a particular request. In response to receiving the request, the production code 123 running on the web service server 105 can generate and send a response message to the application 131 on the client device 107.

The test server 101 may communicate with the web service server 105 through network 103. The test server 101 generally stores one or more test engines or applications for execution on a processing unit 108 of the test server 101. The test engines or applications may take the form of a Java Web application running on the test server 101 for enabling a systems administrator or other user to perform testing of programming code for web services. The test engines of test server 101 may include a request creation engine 109 for automatically creating web service requests, a request processing engine 110 for transmitting generated web service requests to the web service server 105 and receiving response messages associated with respective transmitted requests, and a report engine 111 for reporting programming code testing results to a user or systems administrator. The test engines 109-111 may be sets of machine readable code and/or program instructions configured to cause the processing unit 108 to perform functions related to the testing of programming code on the web service server 105. The machine readable code and/or program instructions may be stored in a memory 112 of server 101.

The memory 112 can store a template 116 for creating a request for a web service. The template 116 provides the structure of the request, includes information or commands to be included in the request, and identifies fields or spaces for inserting input values into the request. Each field or space for inserting input values in the template 116 can include one or more field codes and an indication of the type of input value or parameter to be included in the field or space. In addition, the template 116 can include optional information, commands, fields or spaces that are optionally included in the request. The optional content may be included in the request only if an input value corresponding to the information, command, field, or space is provided for the request. In one example, the template 116 is an XML template used for creating an XML request for a web service. The memory 112 may include one or more templates 116 and may, in one example, include a different template 116 associated with each web service (e.g., each web service application program, and/or each web service API) having programming code that the test server 101 is configured to test.

The memory 112 can store a spreadsheet 113 including potential input values for generating web service requests, such as web service requests for transmission to the web service server 105. In one example, the spreadsheet 113 may include several columns of data entries, each column corresponding to a field of a request for a web service and including one or more potential values for the field of the request. Each column may correspond to a field identified in a corresponding template 116. The memory 112 may include one or more spreadsheet(s) 113 and may, in one example, include a different spreadsheet 113 associated with each web service (e.g., each web service application program, and/or each web service API) having programming code that the test server 101 is configured to test. The spreadsheet 113 is described in more detail with reference to FIGS. 3A and 4B below.

The memory 112 can additionally store a set of web service requests 114, such as a set of web service requests 114 generated based on spreadsheet 113. The set of requests 114 can include many web service requests (e.g., two or more web service requests) used for testing of the new code 124 on the web service server 105. In one example, the set of requests 114 is used by the test server 101 to retrieve web service requests and transmit the requests to the web service server 105, and to receive response messages from the server 105 in response to each request of the set. The request creation engine 109 of server 101 may be configured to retrieve data entries from the spreadsheet 113, and to generate web service requests based on the retrieved data entries. Web service requests are described in more detail with reference to FIG. 3B below. In one example, the test application generates a web service request by selecting one data entry from each column of the spreadsheet, such that the generated web service request includes a data entry for each field of the web service request. In the example, the request creation engine 109 may generate web service requests for each combination of data entries in the spreadsheet 113. The memory 112 may include one or more set(s) of requests 114 and may, in one example, include a different set of requests 114 associated with each web service (e.g., each web service application program, and/or each web service API) having programming code that the test server 101 is configured to test.

The test server 101 can further include a response bank 115, which can be used for storing response messages received from the web service server 105. In one example, the response bank 115 is used to store response messages received from web service server 105 in response to web service requests transmitted to web service server 105 by the request processing engine 110. In the example, the request processing engine 110 may transmit each of the generated web service requests in the set of requests 114 to the web service server 105, and receive a response message for each of the generated web service requests. The request processing engine 110 may store, in the response bank 115, each of the received response messages. In general, the stored response messages are associated with a corresponding web service request, such as the transmitted web service request that the response message was received in response to. The stored response messages can further be associated with a particular version of programming code on the web service server 105, such as the production version 123 or the new version 124 of the programming code. The stored response messages can additionally be associated with a particular run on the web service server 105, associated with a particular date and time, web service application program, web service API, or other appropriate indicators. The memory 112 may include one or more response bank(s) 115 and may, in one example, include a different response bank 115 associated with each web service (e.g., each web service application program, and/or each web service API) having programming code that the test server 101 is configured to test.

The test server 101 may thus be configured to, using request creation engine 109, retrieve a template 116, automatically generate web service requests based on a spreadsheet 113 and the template 116, and store the generated requests in the set of requests 114. The production code 123 is installed on (or run on) the processing unit 120 of web service server 105, such that the web service server 105 provides a web service according to the production code 123. The request processing engine 110 can transmit each of the requests of the set of requests 114 to the web service server 105 running the production code 123, and receive a "production" response message in response to each of the transmitted requests. The request processing engine 110 can store the received "production" response messages in the response bank 115, and associate each stored "production" response message with the web service request that the response message was received in response to. Once all of the "production" response messages are stored in the response bank 115, the new code 124 is installed on the web service server 105, such that the web service server 105 provides a web service according to the new code 124. The request processing engine 110 then transmits each of the requests of the set of requests 114 to the web service server 105 running the new code, and receives a "new" response message in response to each of the transmitted requests. The request processing engine 110 stores the received "new" response messages in the response bank 115 in association with the web service request that the response message was received in response to. The report engine 111 then compares each "new" response message received in response to a particular web service request with the "production" response message received in response to the same particular web service request, and identifies any differences between the "new" and "production" messages.

Figure 2:
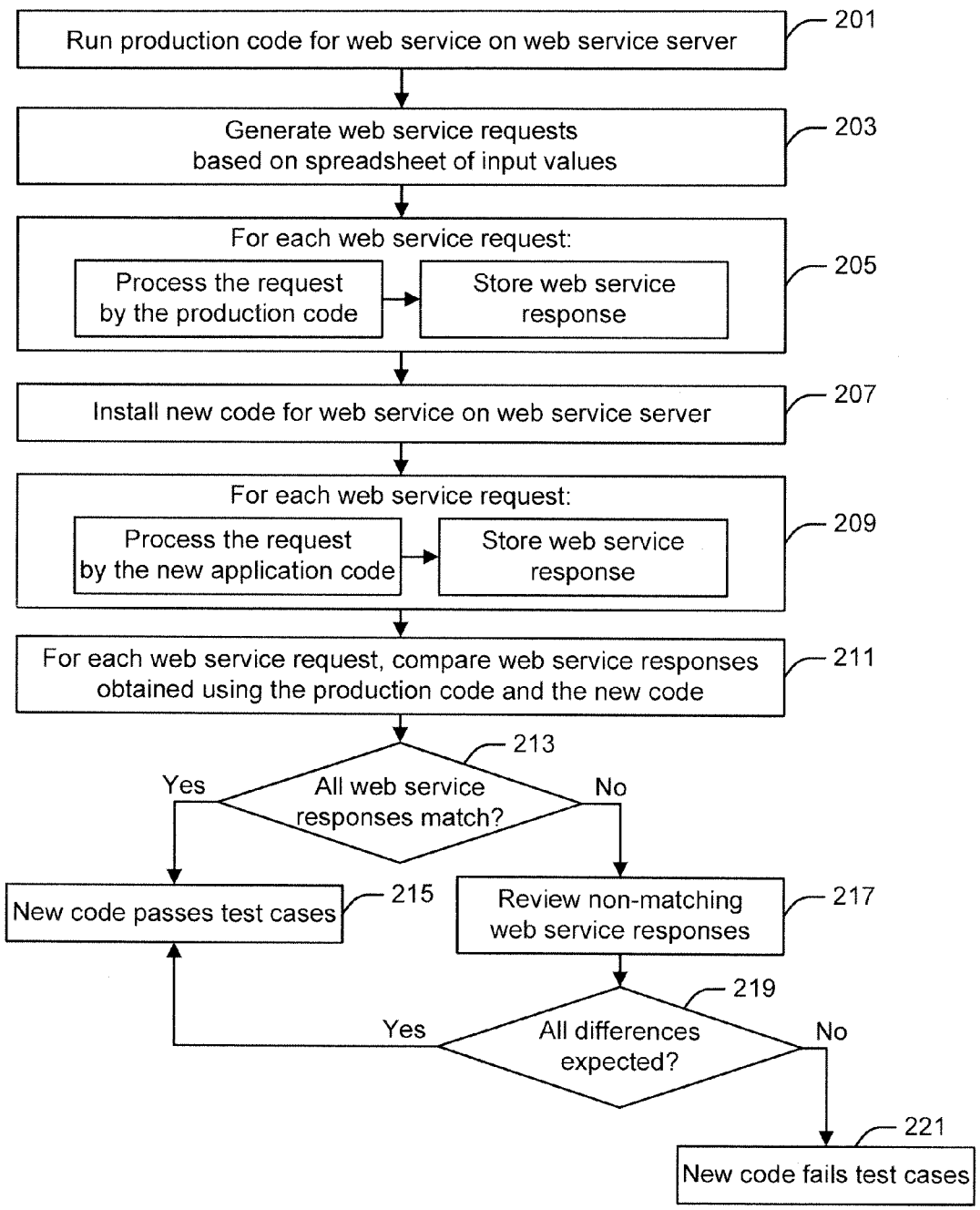
FIG. 2 is a simplified flow diagram showing operations involved in automatically testing programming code for a web service.

FIG. 2 shows a simplified flow diagram showing operations involved in a method 200 for automatically testing programming code for a web service (e.g., for a web service application program or web service API). The method 200 can, for example, be used to test a new version of programming code when a production version of programming code is available.

The method 200 begins at operation 201, in which a production version 123 of programming code (i.e., the production code) is installed on a web service server 105, such that the production version 123 of the programming code runs on a processing unit 120 of the web service server 105. The programming code for the web service may, in some examples, correspond to code for a web service application program running on web service server 105, or to a web service API running on web service server 105. The web service server 105 running the production version 123 of the programming code may provide a web service based on the production code. In particular, the web service server 105 may, in response to receiving from a client device 107 a web service request related to the web service of the production code, transmit to the client device 107 a web service response message based on the production version 123 of programming code running on the web service server 105.

In operation 203, web service requests are generated in a test server 101. The web service requests may be automatically generated by a request creation engine 109 based on a template 116 and a spreadsheet 113 of input values stored in a memory 112 of the test server 101. A web service request for a particular web service may include a plurality of input fields, and the response provided by the web service to the request may be dependent on the input values received in each input field. The structure of the web service request may be specified in a template 116 (e.g., an XML template file) associated with one or more particular web service(s), such as a template 116 stored in the memory 112 of the test server 101. The template 116 may specify the structure of a valid web service request, including information, commands, and/or input fields and corresponding input values or parameters that can be included in a web service request. One or more of the input fields may be mandatory, and require that an input value be provided for the field, while one or more of the input fields may be optional and may not require that an input value be provided for the field. The template 116 may thus identify certain input fields as mandatory, and other input fields as optional. A spreadsheet 113 of input values includes, for each input field for the particular web service, one or more potential input values. The potential input values may include valid input values, invalid input values, blank input values, and/or an indicator that a value and field should be skipped. In operation 203, web service requests may be generated using the template 116 and/or the potential input values included in the spreadsheet 113. In one example, a web service request is generated for each combination of potential input values included in the spreadsheet 113, such that each web service request includes one potential input value from the spreadsheet for each input field of the particular web service the requests are generated for. In the example, if the particular web service has n input fields, and if the spreadsheet includes for each input field n a number $x_n$ of potential input values, a total of $x_1 * x_2 * \ldots * x_n$ web service requests may thus be generated in operation 203. The web service requests generated in operation 203 are stored as a set of requests 114 in a memory 112 of the test server 101.

Once the set of web service requests 114 is generated in operation 203, operation 205 is performed for each of the generated web service requests. In operation 205, a web service request is transmitted to the web service server 105 such that the request can be processed by the production version 123 of programming code running on the web service server 105. The processing of the web service request using the production version 123 of programming code results in the generation of a web service response, which may be transmitted from the web service server 105 to the test server 101 having transmitted the request. The web service response generated by the production version 123 of programming code may be referred to herein as a "production" web service response, and may be a XML file. The test server 101 may store the received web service response in a response bank 115 of a memory 112. In general, the web service response is stored in association with the web service request that the response was received in response to. Operation 205 may be repeated sequentially for each of the web service requests of the set of requests 114, or the operation may be repeated concurrently (or at least partially concurrently) in situations in which the web service server can process multiple requests at the same time.

Once operation 205 is performed for each of the web service requests generated in operation 203, a new version 124 of programming code (i.e., the new code 124) is installed for execution on the processing unit 120 of the web service server 105 in operation 207. Following installation, the new version 124 of the programming code runs on the web service server 105 instead of the production version 123. The web service server 105 running the new version 124 of the programming code may provide a web service based on the new code. In particular, the web service server 105 may, in response to receiving from a client device 107 a web service request related to either the new code or the production code, transmit to the client device a web service response message based on the new version 124 of programming code running on the web service server 105.

In operation 209, each of the generated web service requests generated in operation 203 is transmitted to the web service server 105. In particular, each web service request is transmitted to the web service server 105, such that the request can be processed by the new version 124 of programming code running on the web service server 105. The execution of the new version 124 of programming code in response to each web service request results in the generation of a web service response, which may be transmitted from the web service server 105 to the test server 101 having transmitted the request. The web service response generated by the new version 124 of programming code may be referred to herein as a "new" web service response. The test server 101 may receive the "new" web service response, and store the received "new" web service response in the response bank 115 or other appropriate location in memory 112. In general, the received "new" web service response can be stored in association with the web service request that the response was received in response to, and/or in association with the stored "production" web service response that is associated with the same web service request.

Once operation 209 is performed for each of the web service requests generated in operation 203, the web service responses are processed by a report engine 111 in operation 211. In particular, each stored "new" web service response generated from the new version 124 of programming code on the web service server 105 is compared to a paired "production" web service response generated from the production version 123 of programming code on the web service server 105 in response to the same web service request. The comparison is performed to identify differences between the pair of "new" and "production" web service responses, and is repeated for each generated web service request (and/or for each received web service response pair). Operation 211 may thus be repeated for each pair of web service responses.

In operation 213, the results of the comparisons are compiled to determine whether all pairs of web service responses match. If all pairs of web service responses match, the new version 124 of programming code passes the test cases in operation 215. A user or systems administrator may be provided with an indication that the automatic testing of the new code was successfully completed and that the new version 124 of the code passed the test cases, and an indication of the number of web service response pairs that were used in the test. However, if any pair of web service responses differ (i.e., if at least one pair of web service responses differ), a user or systems administrator may be provided with an indication that the automatic testing of the new code was successfully completed and that the new version 124 of the code failed the test cases (i.e., failed at least one test case).

The method 200 thereby determines whether or not the new version 124 of programming code generates at least one web service response that differs from the corresponding "production" web service response. In situations in which the responses in at least one response pair differ (operation 213, "No" branch), the method 200 may additionally provide an indication of the numbers of web service response pairs that matched and that did not match (or differed). The method 200 may additionally identify in operation 217 each "new" and "production" web service response pair that differ, and identify the web service request(s) associated with the web service response pairs that differ. A user may thus be presented with the "new" and "production" responses in operation 217, the differences between the responses may be identified for the user, and a systems administrator or user may be provided with a chance to review the pairs of responses that differ. The method 200 may further analyze the differences in the web service response pairs, and assign to each web service response pair an error code indicative of a type of difference between the web service response pair. The web service response pairs having similar differences may be grouped (e.g., by grouping web service response pairs having matching error codes). The grouped web service response pairs, and the associated web service requests, may be reported to the systems administrator or other user for review and analysis in operation 217. In operation 219, the administrator may determine whether the differences are expected, for example in the case of new code 124 that is expected to produce a different response message than the production code 123, or unexpected, for example in the case of new code 124 that is defective. If all of the differences are expected, the new version 124 of programming code passes the test cases in operation 215. However, if any pair of web service responses differ, the new version 124 of programming code fails the test cases in operation 221.

If the new version 124 of programming code successfully passes the test cases (operation 215), the new version 124 of code may be deployed for general public use on the web service server 105. The deployment of the new code 124 may provide users' and the users' client devices with the updated web service provided by the new code. In addition, the new code 124 may replace the production code 123 on the web service server 105, such that the new code becomes the production code 123 used for future testing of changes to the programming code. Additionally, the web service responses messages stored as "production" response messages in the response bank 115 may be deleted, and the "new" response messages stored as "production" response messages in the bank 115. Hence, any further changes or revisions made to the programming code will be performed with respect to the programming code having successfully passed the testing. For any further changes or revisions to the programming code, steps 207-221 may thus be repeated to ascertain whether the further changes or revisions to the programming code result in differences in the web service response messages received from the web service server executing the changed or revised code.

FIG. 3A shows an exemplary spreadsheet 113a, such as spreadsheet 113 of FIG. 1 for storing potential input values for inclusion in web service requests. As illustrated, the spreadsheet 113a includes four columns and six rows, although different numbers of columns and rows may be used. Each column, such as columns 301 and 302, corresponds to a particular field of a template or of a web service request. The first row 311 of each column includes a label for an input field, which may correspond to the label for an input field or to the input field code identified in the schema. The remaining rows (e.g., rows 312 and 313) of each column include one or more potential input values for the labeled input field. Each potential input value included in the spreadsheet 113a may be a valid value (e.g., "123-456-7890" as a MDN included in column 301), a skipped value (e.g., "$$skip$$" as a MDN in column 301), or an invalid value (e.g., "Asdf458" as a MDN included in column 301). The spreadsheet 113a and the potential input values can be used to generate web service requests.

Each web service request is generated based on a template 116 for a web service request, and on a spreadsheet 113a associated with the template and the web service request. Each web service request generated based on the potential input values included in the spreadsheet 113a generally includes one potential input value from each column or field of the spreadsheet 113a. For example, a web service request may include the set of potential input values included in each column of row 312 of spreadsheet 113a. In situations in which a potential input value corresponds to a value-to-be-skipped (e.g., "$$skip$$"), a web service request based on the value-to-be-skipped may omit the corresponding field from the request (such that the web service request does not include the field code or any input value for the field). Alternatively, a web service request based on the value-to-be-skipped may include the corresponding field with a blank, zero ("0"), or not-available ("n/a") value in the request (such that the web service request includes the field code and an input value for the field set to blank, "0", "n/a", or the like).

In general, web service requests can be generated based on all possible combinations (and/or all possible permutations) of potential input values included in spreadsheet 113a, such that each web service request includes one input value from each column/field of the spreadsheet 113a. The spreadsheet 113a can thus be used to automatically generate large numbers of web service requests, and to automatically test the functioning of the programming code using the large numbers of web service requests. A spreadsheet 113a having n columns of potential input data, and in which each column has a respective number $x_n$ of potential input values, may therefore be used to generate $x_1 * x_2 * \ldots * x_n$ different web service requests. As a result, even a small amount of data can result in the generation of hundreds of thousands of distinct web service requests (e.g., a spreadsheet having 5 columns, each column having 10 entries, can result in the generation of $10^5$ different web service requests). In another example, however, a different web service request can be generated based on the data in a given row of the spreadsheet 113a, such that m different web service requests can be generated based on a spreadsheet 113a having m rows of potential input values.

FIG. 3B shows two exemplary web service requests 351 and 353. The web service requests 351 and 353 may be web service requests automatically generated based on potential input values for fields included in spreadsheet 113a. In the example shown, web service requests 351 and 353 are extensible markup language (XML) files including input values for various input fields of the service request. Web service request 351 includes input values selected from the potential input values included in row 312 of spreadsheet 113a. Web service request 353 includes a combination of input values selected from rows 312 and 313 of spreadsheet 113a.

As shown, each row of XML web service requests 351 and 353 corresponds to a different field of the web service request. Each row thus includes a field code (e.g., "<MDN>"), followed by an input value for the field (e.g., "123-456-7890"), and followed by a closing field code (e.g., "</MDN>"). The field code and closing field code may be generated based on the template 116 or, in some instances, based on a label for a corresponding field/column of spreadsheet 113a. Each web service request 351, 353 includes multiple rows and/or fields, and each row and/or field generally includes one input value for the corresponding field of the web service request, such that the combination of all rows and fields in the web service request provide the web service with the data required to provide the web service. Upon receiving a request, a web service may retrieve from the request each input value corresponding to a field of the request, and may execute the web service based on the received input values. The web service may generate a web service response for each received web service request based on the received input values included in the request, and may transmit the response back to the entity (e.g., client device 107, or test server 101) having transmitted the request.

Each web service request (e.g., requests 351, 353) may be classified according to whether the request is expected to produce a valid web service response, or whether the request is expected to produce an error response. For example, first web service request 351 includes input values for each of the mandatory fields in the web request, and each of the input values in the request is a valid input value (e.g., "123-456-7890" is a valid MDN). As a result, the production and new programming codes may be expected to produce valid web service responses in response to the first web service request 351. The first web service request 351 may therefore be classified with other web service requests expected to produce valid web service responses. A second web service request 353, however, may not be expected to produce a valid web service response. In the example, web service request 353 includes an invalid MDN (e.g., "Asdf458" is not a valid format for an MDN), fails to include a field or an input value for a mandatory field in the web request (e.g., no field is included for the "FirmwareVersion", no input value is provided for the field FirmwareVersion, and the field FirmwareVersion is not an optional field), includes an invalid combination of input values (e.g., an MDN and a hardware address that do not match), and/or includes another set of web service input values that are not expected to produce a valid web service response. As a result, the production and new codes may not be expected to produce a valid web service response in response to the second web service request 353, and may instead be expected to produce one or more error responses (e.g., an error response message indicating an "invalid MDN", an error response message indicating a "missing FirmwareVersion", an error response message indicating "inconsistent request data", and/or the like). The second web service request 353 may therefore be classified with other web service requests expected to produce an error response.

The classification of web service requests according to whether the request is expected to produce a valid web service response, or expected to produce an error response, can be performed manually. In a first example, a system administrator or other user may assemble a first spreadsheet (e.g., a spreadsheet 113) including potential input values that are expected to produce a valid web service response, and use the first spreadsheet to generate a first set of web service requests that are expected to produce the valid web service responses. The system administrator or other user may then assemble a second spreadsheet (e.g., a spreadsheet 113) including potential input values that are expected to produce error responses, and use the second spreadsheet to generate a second set of web service requests that are expected to produce error responses. The first and/or second set of web service requests may then be selectively used to test the new code using one or both sets of requests. Alternatively, the classification of web service requests can be performed automatically. In a second example, a system administrator or other user may assemble a single spreadsheet (e.g., a spreadsheet 113) including potential input values expected to produce valid and/or error responses. The single spreadsheet can be used to generate web service requests, which may be processed by the production code. The web service requests may then be automatically classified as being expected to produce a valid web service response, or expected to produce an error response, based on whether the production code returns a valid or an error web service response, respectively, in response to each request.

The classification of web service requests according to whether the request is expected to produce a valid web service response, or expected to produce an error response, can be used to selectively test the new code on one or both classes of web service requests. In one example, for example, a first class of web service requests includes only the requests that are expected to produce valid web service responses, and not the requests that are expected to produce error responses. A second class of web service requests includes only the requests that are expected to produce error responses, and not the requests that are expected to produce valid web service responses. In the example, steps 203-213 of method 200 may be performed with respect to the first class of requests only, or with respect to the second class of requests only. The method 200 may thus selectively be used to determine whether the new code passes or fails the test for a particular class of web service request only. The method 200 may also be performed with respect to all classes of requests (e.g., both the first and second classes of web service requests), to determine whether the new code passes or fails the test for all classes of web service requests.

The foregoing description has primarily focused on the automated testing of programming code for a single web service. However, the test server 101 and the web service server 105 can more generally be used to perform automated testing of multiple web services. In general, in order to perform automated testing of multiple web services, the test server 101 may include a different template 116, spreadsheet 113, set of requests 114, and response bank 115 associated with each web service to be tested. Each template 116 may describe the structure and/or contents of a request for the associated web service, and each spreadsheet 113 may include potential input values with which to generate a set of requests 114 for the associated web service. The particular template 116, spreadsheet 113, set of requests 114, and response bank 115 associated with a respective web service can thereby be used to perform the automated testing of the respective web service. In some examples, however, one or more of the template 116, spreadsheet 113, and set of requests 114 may be shared between two or more web services to be tested, and may be used to perform the automated testing of the two or more web services.

The automated testing of programming code for web services can be used to test programming code for multiple web services in series or in combination. An ordered series or combination of web services is referred to as a scenario, and the execution of the scenario includes the sequential execution of each of the web services included in the scenario in a specified order. In general, information included in a response message of one web service of the scenario can be included in a request for another web service of the scenario. As a result, a scenario can be used to test a chain of web services to ensure that the web services function effectively and accurately together, and that an earlier web service in the chain can provide information (e.g., web service response message information) to a web service executed later in the chain.

FIG. 4A shows an exemplary table 117 used for storing configuration data for scenarios used in testing of programming code for web services. The table 117 includes, for each scenario included in the table, a listing of web services that are included as part of the scenario, an ordering of the web services included as part of the scenario, and an identification of particular web service requests that should be used for each web service included in the scenario. In general, the table 117 includes information for one or more scenarios, and each scenario includes two or more web services.

In particular, in the example shown in FIG. 4A, table 117 has a first column which includes, in each line of the table, an identifier "ScenarioID" for a particular scenario that is associated with the line. Different lines that have the same "ScenarioID" identifier are associated with the same scenario. A second column of table 117 includes, in each line of the table, an identifier for a particular web service that is associated with the line, such as a web service name. A third column of the table 117 includes an execution sequence number or other ordering indicator for determining the order in which the web services of each scenario should be executed. Finally, a fourth column includes an identifier for specifying, for each line of the table and the associated web service, a particular web service request that should be used in the scenario. As shown, the identifier for a particular web service request may be a numerical identifier indicating a line of a spreadsheet 113 associated with the particular web service which should be used to generate the web service request.

In the example shown in FIG. 4A, a first scenario (i.e., a scenario having a "ScenarioID" of "1") includes an ordered sequence of four web services. The ordered sequence of web services includes, in order, Checkout, SubmitPurchase, View-Purchases, and GetPendingDownloads web services. Each web service in the scenario sequence is invoked by generating a web service request for the web service, and causing the web service to process the request. The web service request generated for each web service is specified in the fourth column of the table 117. In the example, the "Checkout" web service of the first scenario is invoked using a first web service request having a "RowID" of "2". The "RowID" of "2" identifies a web service request that is generated using the input values included in a second row of a spreadsheet 113 of potential input values associated with the "Checkout" web service (such as the spreadsheet 113a shown in FIG. 3A). The first web service request may thus be generated using the identified row of input values, and processed by the "Checkout" web service. The "Checkout" web service may generate a first web service response message, which is stored in a response bank 115. The "Checkout" web service may additionally cause data to be stored in a database (e.g., a database accessible by web service server 105 through network 103, such as a database stored in test server 101, web service server 105, or another server connected to network 103) or other persistent storage used by the system, and the stored data may be retrieved by subsequent web services in the scenario. Next, the "SubmitPurchase" web service of the first scenario is invoked using a second web service request having a "RowID" of "1". The "RowID" of "1" identifies a web service request that is generated using the input values included in a first row of a spreadsheet 113 of potential input values associated with the "SubmitPurchase" web service. The second web service request may thus be generated using the identified row of input values, and processed by the "SubmitPurchase" web service. The "SubmitPurchase" web service may generate a second web service response message, which is stored in the response bank 115. Similar operations may be performed to generate web service requests for the "ViewPurchases" and "GetPendingDownloads" web services of the scenario, and to obtain and store responses from each of the web services.

In order to test the programming code of the web services included in the scenario, the scenario may be executed using production code for each of the web services, and the "production" responses for each of the web services stored in the response bank. The scenario may then be executed using new code for one or more of the web services in the scenario, and the "new" responses for each of the web services stored in the response bank. The "production" and "new" responses may then be compared to determine whether the new programming code is functioning properly.

When a scenario is used to test programming code for a web service, it may be desirable to include, in a web service request of one web service of the scenario, information received in a web service response message of an earlier web service of the scenario (i.e., a web service that is executed earlier in the sequence of web services of the scenario) or information stored in a database by an earlier web service of the scenario. This may enable the scenario to test additional functionalities of the programming code, such as functionalities allowing web services to share information with each other.

In order to enable such functionality, a spreadsheet 113 including potential input values for generating web service requests may include a command to include, in a web service request, information received in response message of an earlier web service of the scenario. FIG. 4B shows an example of a spreadsheet 113b, such as spreadsheet 113 of FIG. 1 for storing potential input values for inclusion in web service requests. Spreadsheet 113b includes commands for including, as an input value for inclusion in a web service request, information received in a web service response message. In particular, the spreadsheet 113b includes a command "$$1.ConfirmationID$$". The command may indicate that a web service request generated based on the command should include, in a "ConfirmationID" field of the web service request, a ConfirmationID value retrieved from a response message of an earlier web service of the scenario or retrieved from a database storing information from an earlier web service of the scenario.

During execution of a scenario, the web service responses received from each web service of the scenario are generally stored in a response bank 115. The stored responses may be stored including an identifier for the scenario. Each web service of the scenario may additionally or alternatively store data in a database. Following execution of one web service in the scenario, the request creation engine 109 may generate the web service request for the following web service in the scenario. As part of generating the web service request, the request creation engine 109 may determine whether the web service request includes any commands for including information received in a web service response message. If a command is identified, the request creation engine 109 may retrieve from storage in the response bank 115 the information from the response message of an earlier web service of the scenario. Additionally or alternatively, the request creation engine 109 may retrieve from a database information stored by an earlier web service of the scenario. The retrieved information can then be used in generating the web service request. In the example of FIG. 4B, for example, the request creation engine 109 may locate in the response bank 115 a response message of the scenario including "ConfirmationID" information, and retrieve the "ConfirmationID" information for inclusion in the request.

FIG. 5 shows a simplified flow diagram showing operations involved in a method 500 for automatically testing programming code for web services included in a scenario. The method 500 includes several steps that are similar in nature to steps of method 200, and reference can be made to the description of such similar steps.

The method 500 begins at operation 501, in which a production versions of programming code (i.e., the production code) is installed on a web service server 105 for each of the web services included in the scenario. In operation 503, the first web service in the scenario is selected according to the information in table 117 associated with the scenario. A web service request for the selected web service is generated in operation 505 based on the information in table 117 (e.g., "RowID" information) and in a spreadsheet 113 associated with the selected web service. The generated request is processed by the web service in operation 507 using the production code, and the "production" web service response thus obtained is stored in the response bank 115 in operation 509. As long as the scenario includes further web services (operation 511), the next web service in the scenario is selected in operation 513 and operations 505-509 are repeated using the next web service. In further iterations of operation 505, the web service request may be generated using the information in table 117, the information in spreadsheet 113, as well as information retrieved from "production" responses of earlier web services in the scenario that are stored in the response bank 115.

Once all the web services in the scenario have been processed (operation 511), new programming code for one or more web services in the scenario is installed on the web service server 105 (operation 515). If new programming code is available for all of the web services in the scenario, the new programming code for all of the services may be installed on the web service server 105. However, if new programming code is available for only some of the web services in the scenario, the new programming code for those services having new programming code is installed on the web service server 105 while the production code for the remaining web services remains on the web service server 105. Operations 517-527, which are substantially similar to operations 503-513, are performed with respect to the "new" programming code (instead of the "production" code used in operations 503-513) and "new" web service responses are stored in the response bank 115. Once all the web services in the scenario have been processed with the "new" programming code (operation 525), the web service responses obtained using the production and the new code are compared in operation 529. Operation 529 is substantially similar to operation 211, and operations 213-221 may be performed following completion of operation 529.

The method 500 thereby determines whether or not the "new" version(s) of programming code used in the scenario results in at least one web service response differing from the corresponding "production" web service response. Operations 217-219 may be used to determine whether any differences identified between the web service responses are expected, so as to determine whether or not the "new" version(s) of programming code should pass or fail the test cases.

In one example, the testing of new executable programming code for a web service using a scenario including an ordered series of first and second web services may include running a production versions of programming code for the first and second web services of the scenario on a computer system configured as a test environment for the web service. A first web service request is generated for the first web service and is processed via execution of the production version of programming code for the first web service to generate a first web service response, and the first web service response is stored. A second web service request is generated for the second web service using information from the first web service response and is processed via execution of the production version of programming code for the second web service to generate a second web service response, and the second web service response is stored. A new version of programming code for the first web service is installed on the computer system, and the generated first web service request is processed via execution of the new version of programming code for the first web service to generate a third web service response. The third web service response is stored. A third web service request for the second web service is generated using information from the third web service response, and is processed via execution of the production version of programming code for the second web service to generate a fourth web service response. The fourth web service response is stored. Finally, the first and third web service responses are compared, and the second and fourth web service responses are compared, to identify any differences between the compared web service responses.

The automated testing of programming code for a web service may be performed using a user application, such as a web application having a graphical user interface (GUI). FIGS. 6A-6D are illustrations of various graphical user interfaces of an illustrative web-based application for automatically testing programming code for a web service.

FIG. 6A shows a first display screen 601 which may be presented to a user or systems administrator following the comparison of web service responses obtained using the production code and the new code. The display screen 601 of FIG. 6A may be presented, for example, following completion of operation 211 or operation 529 of methods 200 and 500, respectively. The display screen 601 indicates that of the web service requests which were used as part of the testing, the production and new responses obtained for 73 of the web service requests matched and passed the testing while the production and new responses obtained for 2 of the web service requests did not match and failed the testing. The GUI may present the user with the opportunity to review the non-matching web service responses (as described in relation to operation 217), for example by selecting the number of web service responses having failed the test.

FIG. 6B shows a second display screen 603 which may be presented to a user or systems administrator when the user selects to review non-matching web service responses. The display screen 603 shows that as part of testing a web service named "getdeck", the production and new web service responses failed to match in 2 cases. Each of the web service responses that failed to match was assigned an error code based on characteristics of the failed match, and web service responses having a same error code are grouped together. In the particular case shown in FIG. 6B, for example, both web service responses were assigned the same failure code (i.e., failure code "Code: 200, Desc: Success"), and the web service responses are therefore grouped together. A user may be presented with the opportunity to review the individual web service responses in more detail by selecting a particular web service response to review.

FIG. 6C shows a third display screen 605 which may be presented to a user or systems administrator when the user selects to review a particular web service response in detail. The display screen 605 shows a split-screen in which the web service responses obtained using the production code and the new code are presented side-by-side. As shown, the web service response obtained using the production code is shown as an "Expected" response on the left side, while the web service response obtained using the new code is shown as an "Actual" response on the right side. A user may review the responses in order to identify the differences between the responses, and determine whether the differences are expected or not (i.e., to make a determination such as that performed in operation 219 of method 200). If the differences between the responses are expected, the user may select a "Bank It" option so as to designate the web service response obtained using the new code as being an acceptable (or non-erroneous) response. The "Expected" and "Actual" responses may be very long, and the difference(s) between the responses may be very minor (e.g., the responses may differ by a single character). In order to assist a user in comparing the responses, the user may select a "Show Differences" option in order to be presented with only those portions of the "Expected" and "Actual" responses that differ from each other.

FIG. 6D shows a fourth display screen 607 which may be presented to a user or systems administrator when the user selects to see only those portions of "Expected" and "Actual" responses that differ from each other. The display screen 607, using a split-screen presentation similar to that shown in FIG. 6C, shows only those lines or sections of the "Expected" and "Actual" web service responses that differ from each other. A user may therefore, with a single action to select a "Show Differences" option, be presented with only those portions of the responses that contain differences. The user may then, based on the portions containing the differences, determine whether the differences are expected (e.g., a different response is expected as a result to the changes to the programming code), or whether the differences are the result of an error in the code. In the example shown, for example, the differences may result from the new code providing a web service response including additional response information related to a DeviceIcon. If the differences are expected, the user may select the "Bank It" so as to designate the web service response obtained using the new code as being an acceptable (or non-erroneous) response. If the differences are not expected, the user may correct the "new" production code in order to address the discrepancy.

As shown by the above discussion, functions relating to testing of programming code for a web service may be implemented on one or more computers, for example, operating as a test server and a web service server as shown in FIG. 1. Although special purpose devices may be used, such devices also may be implemented using one or more general-purpose computer hardware platforms. The code and spreadsheet for implementing the testing, as well as the production and new versions of the code for a web service, are stored within the general-purpose computer platform(s). At other times, however, any or all of the programming code and spreadsheet data may be stored at other locations and/or transported for loading into the appropriate general-purpose computer system or systems. Execution of code and processing of the spreadsheet data by a processor of the computer platform(s) enables the platform(s) to implement the methodology for testing of programming code for a web service, in essentially the manner performed in the implementations discussed and illustrated herein.

Figure 7:
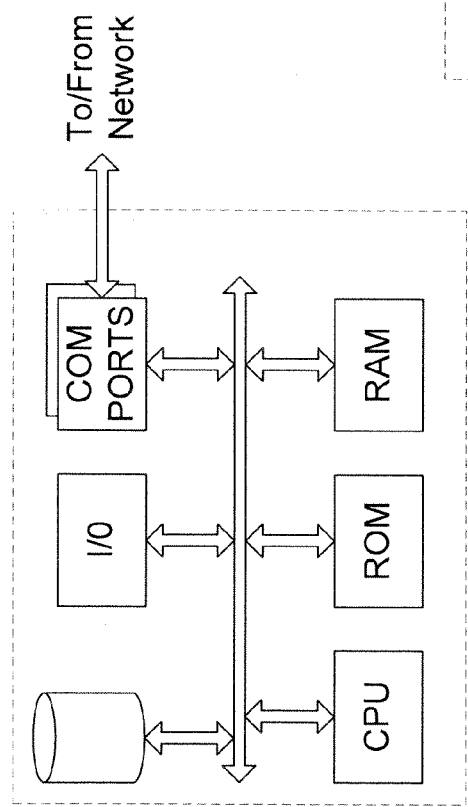
FIG. 7 is a simplified functional block diagram of a computer that may be configured as a host or server, for example, to function as the web service server in the system of FIG. 1.
Figure 8:
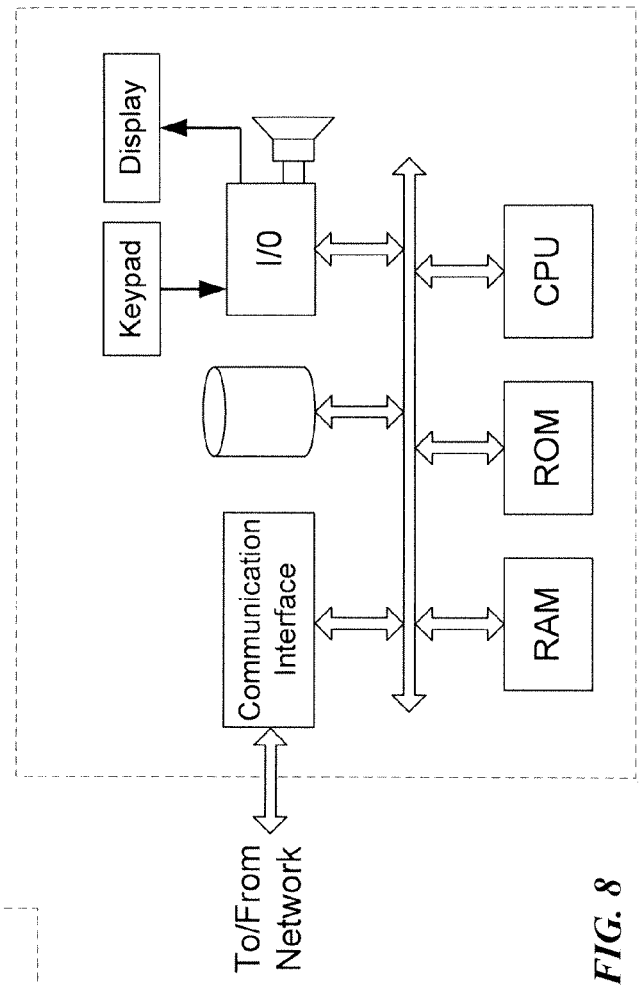
FIG. 8 is a simplified functional block diagram of a personal computer or other work station or terminal device.

FIGS. 7 and 8 provide functional block diagram illustrations of general purpose computer hardware platforms. FIG. 7 illustrates a network or host computer platform, as may typically be used to implement a server or server system. FIG. 8 depicts a computer with user interface elements, as may be used to implement a personal computer or other type of work station or client device, although the computer of FIG. 8 may also act as a server if appropriately programmed.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. Of course, the server functions may be implemented in a distributed fashion on a number of similar platforms, to distribute the processing load.

A computer type user client device, such as a PC or tablet computer, a smartphone, or the like, similarly includes a data communication interface CPU, main memory and one or more mass storage devices for storing user data and the various executable programs (see FIG. 8). A mobile client device may include similar elements, but will typically use smaller components that also require less power, to facilitate implementation in a portable form factor. The various types of user client devices will also include various user input and output elements. A computer, for example, may include a keyboard and a cursor control/selection device such as a mouse, trackball, joystick or touchpad; and a display for visual outputs. A microphone and speaker enable audio input and output. Some smartphones include similar but smaller input and output elements. Tablets and other types of smartphones utilize touch sensitive display screens, instead of separate keyboard and cursor control elements. The hardware elements, operating systems and programming languages of such user terminal devices also are conventional in nature, and it is presumed that those skilled in the art are adequately familiar therewith.

Hence, aspects of the methods of automatically testing programming code for a web service outlined above may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a test server 101 or host computer into the computer platform of the web service server 105. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the test or web service servers 101 and 105 shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method of testing new executable programming code for a web service, comprising steps of:
running a production version of programming code for the web service on a computer system configured as a test environment for the web service;
based on a spreadsheet of potential input values for fields of requests for the web service, automatically generating web service requests on the computer system configured as a test environment for the web service;
processing the automatically generated web service requests via execution of the production version of the programming code for the web service to generate web service responses, and storing the web service responses generated from the production version of the programming code for the web service on the computer system configured as a test environment for the web service;
installing a new version of programming code for the web service on the computer system configured as a test environment for the web service;
processing the automatically generated web service requests via execution of the new version of the programming code for the web service to generate web service responses, and storing the web service responses generated from the new version of the programming code for the web service on the computer system configured as a test environment for the web service;
automatically comparing the stored web service responses generated via execution of the new version of the programming code for the web service to the stored web service responses generated via execution of the production version of the programming code for the web service; and
compiling a result of the automatic comparison to determine whether all pairs of web service responses match.

2. The method of claim 1, wherein the automatically comparing the stored web service responses further comprises:
determining, for each generated web service request, whether a pair of web service responses, generated in response to each web service request via execution of the new version of the programming code for the web service and via execution of the production version of the programming code for the web service, match; and
determining that the new version of the programming code for the web service fails the testing if at least one pair of web service responses does not match, or that the new version of the programming code for the web service passes the testing if the pairs of web service responses match for all generated web service requests.

3. The method of claim 2, further comprising step of:
upon determining that at least one pair of web service responses does not match, identifying to a user the at least one pair of web service responses and differences between the web service responses of the at least one pair.

4. The method of claim 2, further comprising step of:
upon determining that the pairs of web service responses match for all generated web service requests, replacing the production version of the programming code for the web service with the new version of the programming code for the web service on the computer system configured as a test environment for the web service.

5. The method of claim 1, wherein:
the automatically generating web service requests further comprises generating a web service request based on a template identifying one or more fields to include in the web service requests; and
the automatically generated web service requests each include an input value from the spreadsheet of potential input values for each of the one or more fields identified in the template.

6. The method of claim 5, wherein:
the spreadsheet of potential input values includes a column of potential input values corresponding to each of the one or more fields identified in the template; and
the automatically generating web service requests further comprises generating a web service request for each combination of potential input values including one potential input value selected from each column in the spreadsheet of potential input values.

7. The method of claim 1, wherein:
the processing of the automatically generated web service requests via execution of the production version of the programming code for the web service further comprises processing only automatically generated web service requests that are expected to generate error web service responses via execution of the production version of the programming code for the web service to generate web service responses;
the processing of the automatically generated web service requests via execution of the new version of the programming code for the web service further comprises processing only automatically generated web service requests that are expected to generate error web service responses via execution of the new version of the programming code for the web service to generate web service responses; and
the automatic comparison of the stored web service responses further comprises automatically comparing the web service responses generated by the processing only automatically generated web service requests that are expected to generate error web service responses from the production and new versions of the programming code for the web service.

8. The method of claim 1, wherein a response bank stores the web service responses generated from the production version of the programming code for the web service and the web service responses generated from the new version of the programming code for the web service.

9. A system comprising:
at least one memory configured to store:
a spreadsheet of potential input values for fields of requests for a web service; and
a production version of programming code for the web service and a new version of programming code for the web service; and
at least one processing unit configured to perform functions to configure the system as a test environment for testing new executable programming code for the web service, comprising functions to:
run the production version of the programming code for the web service on the system configured as a test environment for the web service;
automatically generate web service requests on the system configured as a test environment for the web service based on the stored spreadsheet of potential input values for fields of requests for the web service;
process the automatically generated web service requests via execution of the production version of the programming code for the web service to generate web service responses, and store the web service responses generated from the production version of the programming code for the web service on the system configured as a test environment for the web service;
install the new version of the programming code for the web service on the system configured as a test environment for the web service;
process the automatically generated web service requests via execution of the new version of the programming code for the web service to generate web service responses, and store the web service responses generated from the new version of the programming code for the web service on the system configured as a test environment for the web service;
automatically compare the stored web service responses generated via execution of the new version of the programming code for the web service to the stored web service responses generated via execution of the production version of the programming code for the web service; and
compile a result of the automatic comparison to determine whether all pairs of web service responses match.

10. The system of claim 9, wherein the function to automatically compare the stored web service responses further comprises functions to:
determine, for each generated web service request, whether a pair of web service responses, generated in response to each web service request via execution of the new version of the programming code for the web service and via execution of the production version of the programming code for the web service, match; and
determine that the new version of the programming code for the web service fails the testing if at least one pair of web service responses does not match, or that the new version of the programming code for the web service passes the testing if the pairs of web service responses match for all generated web service requests.

11. The system of claim 9, wherein the at least one processing unit is further configured to perform functions comprising function to:
upon determining that at least one pair of web service responses does not match, identify to a user the at least one pair of web service responses and differences between the web service responses of the at least one pair.

12. The system of claim 9, wherein the at least one processing unit is further configured to perform functions comprising function to:
upon determining that the pairs of web service responses match for all generated web service requests, replace the production version of the programming code for the web service with the new version of the programming code for the web service in the at least one memory storing the production version of the programming code for the web service.

13. The system of claim 9, wherein:
the function to automatically generate web service requests further comprises a function to generate a web service request based on a template identifying one or more fields to include in the web service requests; and
the automatically generated web service requests each include an input value from the stored spreadsheet of potential input values for each of the one or more fields identified in the template.

14. The system of claim 13, wherein:
the stored spreadsheet of potential input values includes a column of potential input values corresponding to each of the one or more fields identified in the template; and
the function to automatically generate web service requests further comprises a function to generate a web service request for each combination of potential input values including one potential input value selected from each column in the stored spreadsheet of potential input values.

15. The system of claim 9, wherein:
the function to process the automatically generated web service requests via execution of the production version of the programming code for the web service further comprises a function to process only automatically generated web service requests that are expected to generate error web service responses via execution of the production version of the programming code for the web service to generate web service responses;
the function to process the automatically generated web service requests via execution of the new version of the programming code for the web service further comprises a function to process only automatically generated web service requests that are expected to generate error web service responses via execution of the new version of the programming code for the web service to generate web service responses; and
the function to automatically compare the stored web service responses further comprises a function to automatically compare the web service responses generated by the function to process only automatically generated web service requests that are expected to generate error web service responses from the production and new versions of the programming code for the web service.

16. The system of claim 9, wherein the at least one memory is further configured to store a response bank for storing the web service responses generated from the production version of the programming code for the web service and the web service responses generated from the new version of the programming code for the web service.

17. A non-transitory computer-readable medium encoded with instructions for testing new executable programming code for a web service, wherein execution of the instructions configures a computer to implement functions, comprising functions to:
run a production version of programming code for the web service on a computer system configured as a test environment for the web service;
based on a spreadsheet of potential input values for fields of requests for the web service, automatically generate web service requests on the computer system configured as a test environment for the web service;
process the automatically generated web service requests via execution of the production version of the programming code for the web service to generate web service responses, and store the web service responses generated from the production version of the programming code for the web service on the computer system configured as a test environment for the web service;
install a new version of programming code for the web service on the computer system configured as a test environment for the web service;
process the automatically generated web service requests via execution of the new version of the programming code for the web service to generate web service responses, and store the web service responses generated from the new version of the programming code for the web service on the computer system configured as a test environment for the web service;
automatically compare the stored web service responses generated via execution of the new version of the programming code for the web service to the stored web service responses generated via execution of the production version of the programming code for the web service; and
compile a result of the automatic comparison to determine whether all pairs of web service responses match.

18. The non-transitory computer-readable medium of claim 17, wherein the function to automatically compare the stored web service responses further comprises functions to:
determine, for each generated web service request, whether a pair of web service responses, generated in response to each web service request via execution of the new version of the programming code for the web service and via execution of the production version of the programming code for the web service, match; and
determine that the new version of the programming code for the web service fails the testing if at least one pair of web service responses does not match, or that the new version of the programming code for the web service passes the testing if the pairs of web service responses match for all generated web service requests.

19. The non-transitory computer-readable medium of claim 18, wherein the instructions further configure the computer to implement functions comprising function to:
upon determining that at least one pair of web service responses does not match, identify to a user the at least one pair of web service responses and differences between the web service responses of the at least one pair.

20. The non-transitory computer-readable medium of claim 18, wherein the instructions further configure the computer to implement functions comprising function to:
upon determining that the pairs of web service responses match for all generated web service requests, replace the production version of the programming code for the web service with the new version of the programming code for the web service on the computer system configured as a test environment for the web service.

21. The non-transitory computer-readable medium of claim 17, wherein:
the function to automatically generate web service requests further comprises generating a web service request based on a template identifying one or more fields to include in the web service requests; and
the automatically generated web service requests each include an input value from the spreadsheet of potential input values for each of the one or more fields identified in the template.

22. The non-transitory computer-readable medium of claim 21, wherein:
the spreadsheet of potential input values includes a column of potential input values corresponding to each of the one or more fields identified in the template; and
the function to automatically generate web service requests further comprises generating a web service request for each combination of potential input values including one potential input value selected from each column in the spreadsheet of potential input values.

23. The non-transitory computer-readable medium of claim 17, wherein:
the function to process the automatically generated web service requests via execution of the production version of the programming code for the web service further comprises a function to process only automatically generated web service requests that are expected to generate error web service responses via execution of the production version of the programming code for the web service to generate web service responses;
the function to process the automatically generated web service requests via execution of the new version of the programming code for the web service further comprises a function to process only automatically generated web service requests that are expected to generate error web service responses via execution of the new version of the programming code for the web service to generate web service responses; and
the function to automatically compare the stored web service responses further comprises a function to automatically compare the web service responses generated by the function to process only automatically generated web service requests that are expected to generate error web service responses from the production and new versions of the programming code for the web service.

24. The non-transitory computer-readable medium of claim 17, wherein a response bank stores the web service responses generated from the production version of the programming code for the web service and the web service responses generated from the new version of the programming code for the web service.

* * * * *